United States Patent Office 3,503,929
Patented Mar. 31, 1970

3,503,929
POLYIMIDAZOQUINAZOLINES AND
POLYAMIDOBENZIMIDAZOLES
Basil L. Loudas, St. Paul, Minn., assignor to Minnesota
Mining and Manufacturing Company, St. Paul, Minn.,
a corporation of Delaware
No Drawing. Filed Oct. 21, 1965, Ser. No. 500,198
Int. Cl. C08g 20/00
U.S. Cl. 260—47                                  9 Claims

ABSTRACT OF THE DISCLOSURE

Di-(aminoaryl) bibenzimidazoles are reacted with aromatic, heterocyclic or aliphatic dicarboxylic acid halides to form first stage polyamidobenzimidazoles which are soluble in certain solvents and can be fabricated into structures, and the first stage polymers are condensed by elimination of water, e.g. by heating, to form strong, high temperature resistant polybenzimidazoquinazolines. The first stgae polymers are soluble in e.g. dimethylformamide, dimethylacetamide, N-methylpyrrolidone and the like, while the second stage polymers are substantially insoluble, infusible materials. The polymers can also be formed by melt polymerization of a mixture of an aromatic tetramine and an ester of N,N'-di-(o-carboxyphenyl) aromatic or aliphatic dicarboxylic acid amide.

Films, fibers and molded articles can be made from the resulting polymers, which have good dielectric properties and are resistant to high temperatures.

This invention relates to a novel and useful class of condensation polymers and to processes for preparing the same. More particularly, the invention is concerned with linear condensation polymers comprising polybenzimidazoquinazolines which are characterized by a high degree of thermal and chemical stability.

Nonpolymeric benzimidazoquinazoline compounds are known in the art as reported by Davis et al., J. Chem. Soc., (1962), 945. However, so far as is known, polymers containing the benzimidazoquinazoline moiety as the structural unit in the chain backbone have not been prepared heretofore.

It is an object of this invention to provide a novel and useful class of linear condensation polymers which possess benzimidazoquinazoline nuclei as a part of the recurring units in the polymeric chain. As a class, such polymers are herein termed "polybenzimidazoquinazolines."

Another object of this invention is to provide linear polymeric materials comprising polybenzimidazoquinalines which are characterized by a high level of thermal, chemical and radiation stability, and by their useful film and fiber forming properties.

A further object is to provide novel and useful processes for the preparation of such linear polybenzimidazoquinazolines.

It is a still further object of this invention to provide shaped articles of the novel polybenzimidazoquinazolines, as well as films, fibers, laminates and coated articles made with these polymers. Other objects of the invention will become apparent from the disclosures in the following specification and claims.

The polybenzimidazoquinazolines of the invention are substantially linear polymers having the recurring unit

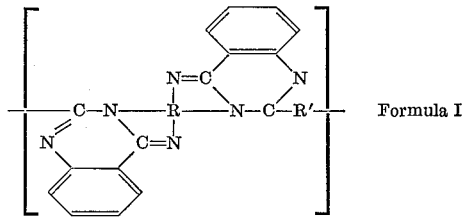

Formula I wherein R is a tetravalent radical containing at least one 6-carbon aromatic ring, each pair of the nitrogen atoms attached thereto being attached to adjacent carbon atoms in a ring of the R radical; and R' is a divalent radical of the group consisting of divalent radicals containing at least one 6-carbon aromatic ring, divalent aliphatic radicals and divalent heterocyclic radicals.

Illustrative of the aromatic radicals comprising R in the above formula are:

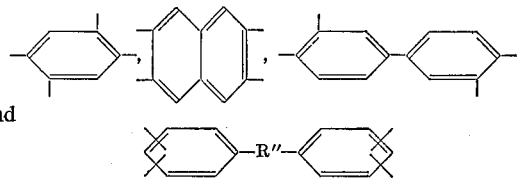

and

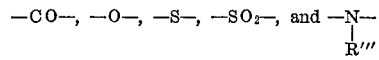

wherein R" is selected from the group consisting of carbon in an alkylene chain having 1–3 carbon atoms, $$-CO-, -O-, -S-, -SO_2-, \text{ and } -\underset{\underset{R'''}{|}}{N}-$$

wherein R''' is alkyl or aryl. Similarly illustrative of the aromatic and heterocyclic radicals comprising R' in the above formula are:

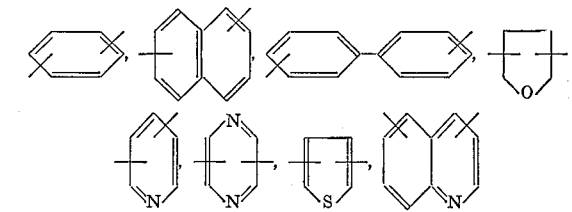

and

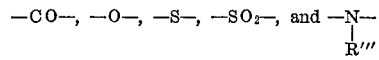

wherein R" and have the same significance as hereinabove.

Divalent aliphatic radicals illustrative of R' are alkylene radicals having from 1 to 12 carbon atoms e.g.; polymethylene radicals, fluorinated alkylene radicals, alkylene radicals containing oxa and thio groups, and the like.

The polybenzimidazoquinazolines are strong, tough, substantially linear polymer materials. The number of repeating units present can vary widely, from ten to hundreds or even thousands of such units. As is known, polymers usually contain groups of varying chain length, the average length of which may be expressed by $n$. These chains are terminated by amino, carboxyl or carboxyl halide groups. Their outstanding thermal stability and chemical inertness confer advantageous properties.

One useful process in accordance with the present invention for preparing linear polybenzimidazoquinazolines comprises the steps of solution polymerizing a mixture of (1) an aromatic dicarboxylic acid dichloride and (2) a member of the class consisting of di-(o-amino phenyl) bibenzimidazoles of the structure:

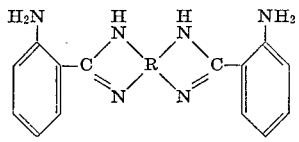

wherein R has the significance set forth hereinabove, to form a polyamidobenzimidazole, and thermally or chemically cyclizing the product of the solution polymerization the the fully condensed second stage polybenzimidazoquinazoline.

In the first stage of the polymerization, a polyamidobenzimidazole of Formula II is formed according to the equation:

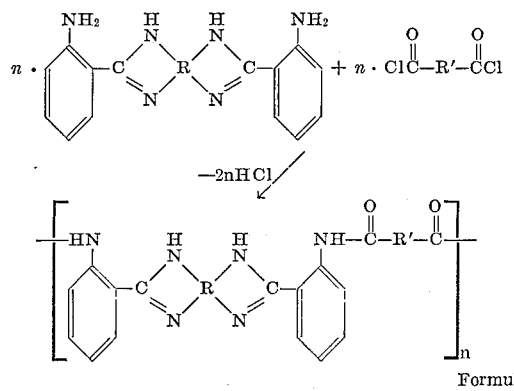

Formula II wherein R and R' have the significance heretofore set forth. Chains of various lengths are formed, as is known, and $n$ is a number which is an average of the number of repeating units in these chains. In the case of the higher molecular weight polymers, $n$ is a number upwards of about 20.

In this stage, the polymers are soluble in certain solvents as hereinafter described and are easily handled for fabrication. Plasticizers, pigments, fillers, and the like can be added to these first stage polymers. Upon removal of the solvent and elimination of water as by heating under atmospheric pressure or in vacuo, or by chemical treatment as with dehydrating agents (e.g., aliphatic or aromatic acid anhydrides) the final stage polybenzimididazoquinazoline polymer is formed having the structure shown in Formula I above. The condensation of the dicarboxylic acid dichloride with the diaminobibenzimidazole, to form the polymers of the invention, readily takes place, preferably in solution in a suitable solvent.

Examples of solvents which are useful for the purpose of this process are dimethylformomide, dimethylacetamide, N-methylpyrrolidone and the like. An acid acceptor, such as triethylamine, or pyridine, may be added to the reaction mixture to aid in the condensation of the acid chloride and the amine.

If desired, the reaction mixture can be cooled below room temperature, say to about $-30°$ C. or lower. The reaction temperature can thus be of the order of $-30°$ C. to $70°$ C., and preferably about $0°$ C. to $30°$ C. The first-stage polymers are for best results prepared to have an inherent viscosity in dimethyacetamide of the order of about 0.2 to 1.0.

The removal of the elements of water from the first-stage polymer to cyclize or "cure" the polymer in the second stage is readily effected by heating to a temperature in the range of $190°$ to $350°$ C. At the same time, any solvent present is evaporated leaving the polymer as a hard, essentially infusible mass. Most of the polymers thus formed have no melting points so that when they are heated to decomposition in air, at extreme temperatures over $500°$ C., they darken and char without melting.

Representative acyl halides of dicarboxylic acids which are useful in this first process of the invention are the acid chlorides of phthalic acid, isophthalic acid, terephthalic acid, naphthalene-1-4-dicarboxylic acid, naphthalene-1,6-dicarboxylic acid, naphthalene-2,6-dicarboxylic acid, pyridine-3,5-dicarboxylic acid, pyrazine-2,5-dicarboxylic acid, quinoline-2,6-dicarboxylic acid, adipic acid, oxydipropionic acid, and the like. In addition, these aromatic dicarboxylic acids wherein the two carboxyl groups are on separate aromatic nuclei, the nuclei being joined through a carbon-to-carbon bond, an ether linkage, a keto group, or other similar linking groups, can be uitilized.

Representative of this latter class are the dichlorides or other dihalides of 4,4'-biphenyl dicarboxylic acid, 2,2', biphenyl dicarboxylic acid, diphenyl ether 4,4-dicarboxylic acid, bezophenone-4,4'-dicarboxylic acid, diphenyl methane-4,4'-dicarboxylic acid, bibenzoic acid, and the like.

If desired, an amount of an aromatic or aliphatic tricarboxylic acid, e.g., 1,4,5-benzene tricarboxylic acid can be added as the trihalide, to provide a number of sites where crosslinking can occur. The polymers thus produced, while still essentially linear, have altered physical properties and are tougher and stronger by virtue of the crosslinking.

Suitable diamines derived from bibenzimidazoles which bear two o-aminophenyl substituents upon the isolated carbon atom of the imidazole nucleus may have both imidazole nuclei attached to one aromatic nucleus, either a single ring, or a fused ring system, as 2,6-di-(o-aminophenyl) diimidazo benzene [1,2;4,5], 2,7-di-(o-aminophenyl) diimidazonaphthalene [2,3;6.7], or the like. The di-(o-aminophenyl) bibenzimidazoles also include those in which there is one imidazole nucleus attached to each of two rings, the rings being separated by a carbon-to-carbon bond; another linkage, or other small linking group.

Among such compounds may be named (as examplary) 2,2'-di-(o-aminophenyl)-5,5'-bibenzimidazole, 2,2'-di-(o-aminophenyl)-5,5'-oxy-bibenzimidazole and other similar compounds. These compounds are prepared by known methods, such as the reaction of o-nitrobenzoyl chloride with the selected aromatic diamine, followed by nitration and reduction. Suitable aromatic amines for this purpose include benzidine, oxydianiline, 4,4'-diaminodiphenylmethane, 4,4'-diaminodiphenylpropene, 4,4'-diaminodiphenyl sulfide, bis(4-aminophenyl) silane, 4,4'-diaminodiphenyl sulfone, bis(4-aminophenyl) phosphine oxide, bis(4-aminodiphenyl)-N-methylamine, 1,5-diaminonaphthalene, meta-phenylene diamine, and the like. These compounds are also prepared by melt condensation of selected aromatic tetraamines, such as 3,3'-diaminobenzidine, 3,3',4,4'-tetraaminodiphenyl ether, 1,2,4,5-tetraaminobenzene, etc. with phenyl anthranilate.

The formation of polybenzimidazoquinazolines by interaction of any of the above-named dicarboxylic acid dichlorides, or mixtures thereof, with the di-o-aminophenyl bibezimidazoles or mixtures of these diamines is illustrated by the following equations, where isophthaloyl chloride and 2,2'di-(o-aminophenyl)-5,5'-bibenzimidazole are used as representative reactants:

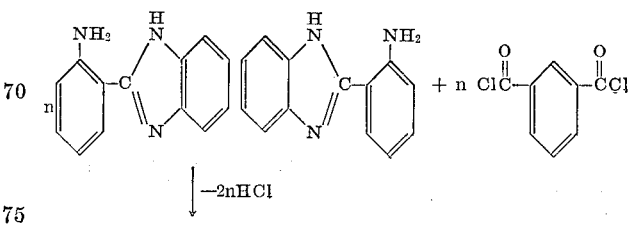

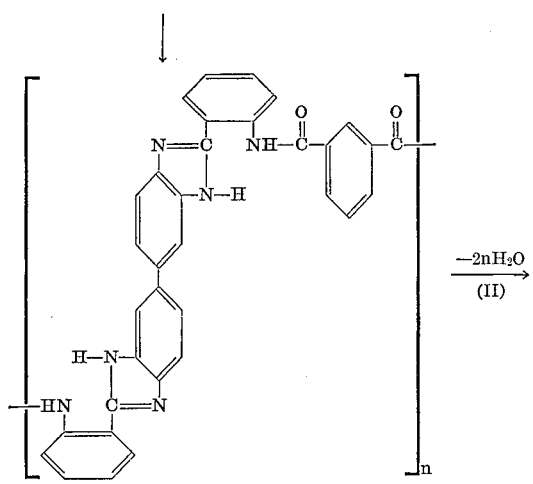

$$\xrightarrow{-2nH_2O}$$

(II)

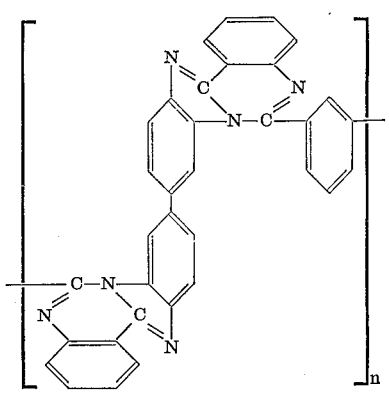

The polymers of this invention may also be prepared by a second process, comprising melt polymerizing a mixture of (1) an aromatic compound containing a pair of ortho-diamino substitutents on the aromatic nucleus, i.e., a tetraamine, and (2) a member of the class consisting of the diphenyl ester of N,N'-di-(o-carboxy phenyl) dicarboxylic acid amides of the general structure:

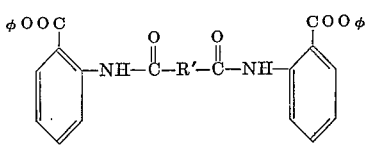

wherein R' has the significance heretofore set forth.

In this alternative process of the present invention the reactant or reactants are subjected to a temperature sufficiently high to melt them, in an inert atmosphere such as nitrogen. Reduced pressure can be employed to assist with removal of the condensation by-products, phenol and water. Generally, an initial temperature of about 200° C. is satisfactory with the temperature being raised gradually to about 300° C. over a half-hour period and with the gradual reduction of pressure to a pressure of about 0.5 mm. of mercury. It is preferred, however, to heat over a longer period, e.g., from about one to about five hours at reduced pressure.

After formation of the melt-polymerized product, which consists of a mixed amide benzimidazole-benzimidazoquinazoline polymer, a product of higher molecular weight which consists of the fully cyclized polybenzimidazoquinazoline can be formed by pulverizing the melt-formed material and subjecting the powder to high temperatures under reduced pressure. This solid state, powder form polymerization is performed at temperatures above about 250° C., preferably at about 300° C. to 400° C. under a pressure not greater than about 0.5 mm. of mercury. A period of about 2 hours is generally satisfactory, however, longer periods of e.g. 4 to 6 hours are preferred for best results.

The polybenzimidazoquinazoline polymers prepared in accordance with this second process of the invention can be shaped to form fibers, films and other shaped articles of wide utility. In the case of some of these polymers, melt temperatures are low enough that fabrication may be accomplished directly from the melt, particularly in those cases where the intermediate polymers of the melt polymerization are employed. Where melt temperatures are too high, solutions can be prepared from which shaped articles may be formed. The polymers are characterized by solubility in relatively few solvents, but all are soluble in concentrated sulfuric acid, producing stable solutions. Many of the polymers are also soluble in solvents such as formic acid, N,N-dimethyl acetamide, N-methyl pyrrolidone, dimethyl sulfoxide and the like, forming solutions which are highly useful for the casting of films and other solution fabrication. The polymers find utility in many areas of application as set forth more particularly hereinafter.

Representative suitable tetraamino compounds for use in the melt-condensation process may have both pairs of the ortho-diamino substituents on one aromatic nucleus, either on a single ring or a fused ring system as 1,2,4,5-tetraaminobenzene, 2,3,6,7-teraaminonaphthalene, or the like. The tetraamino compounds also include those in which there is one pair of ortho diamino substituents on each of two rings, the rings being separated by a carbon-to-carbon bond, an ether linkage, or other small linking group. Among such compounds may be named 3,3'-diaminobenzidine, 3,3',4,4'-tetraamino diphenyl ether and 3,3',4,4'-tetraamino diphenyl sulfone.

Suitable diphenyl esters of N,N'-di-(o-carboxy phenyl)-dicarboxylic acid amides are those derived from condensation of phenyl anthranilate with the same aromatic dicarboxylic acids which are discussed above in connection with the diacid chlorides, e.g., the diphenyl esters of N,N'-di-(o-carboxy phenyl) isophthalamide and the dianthranil amides of naphthalene-1,4-dicarboxylic acid, pyridine-2,5-dicarboxylic acid, pyrazine-2,6-dicarboxylic acid, furan-2,5-dicarboxylic acid, quinoline-2,6-dicarboxylic acid, etc. can be used.

The formation of polybenzimidazoquinazolines by the interaction of any of the above named tetraamino compounds with diphenyl esters of N,N'-di-(o-carboxyphenyl) dicarboxylic acid amides may be illustrated by the following equations where 3,3'-diaminobenzidine and N,N'-di-(o-carboxyphenyl) isophthalamide diphenyl ester are used as representative reactants:

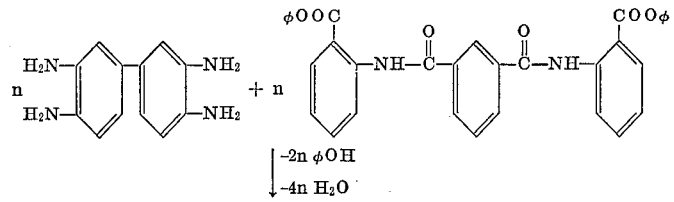

$$\downarrow -2n\,\phi OH$$
$$\downarrow -4n\,H_2O$$

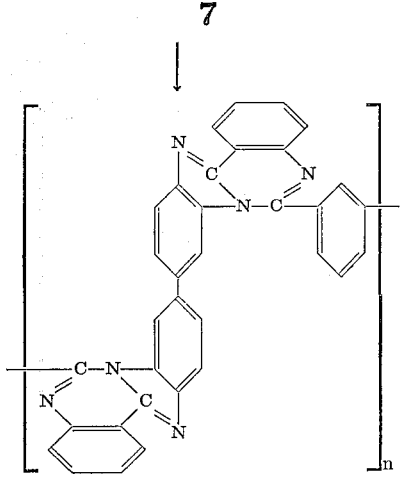

As illustrated by the samples, solution polymerization of diacid chlorides and di-(o-amino phenyl) bibenzimidazoles and subsequent cyclization, as well as melt polymerization of aromatic tetraamino compounds with diphenyl esters of N,N′-di-(o-carboxy phenyl) dicarboxylic acid amides followed by solid-state polymerization, can be employed to obtain a linear, high molecular weight polybenzimidazoquinazoline of the head-head, tail-tail configuration. These polymers may be represented as consisting essentially of repeating units having the formula:

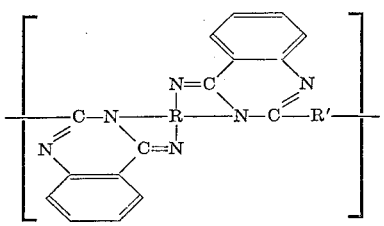

wherein R and R′ have the significance heretofore set forth.

The polymers of the invention can be formed into transparent films by solvent casting in the first stage polyamidobenzimidazole form as obtained from the solution condensation process, followed by removal of solvent and water to form the second stage polybenzimidazoquinazoline.

The linear polybenzimidazoquinazolines find wide utility in numerous areas of application where their highly stable nature is effectively utilized. They are particularly useful in the form of films and fibers which show great resistance to degradation by heat, hydrolytic media and oxidizing media and which will retain their properties for extended periods, even in uses where other materials rapidly deteriorate. They have excellent dielectric properties and can be employed as electrical insulators, such as wire enamels, and insulating coatings, particularly for applications where high temperatures and corrosive environments are encountered.

Laminates can be made from the polymers, as by impregnating glass fiber cloth with a solution of the first stage amide benzimidazole polymer, pressing several layers together and heating under pressure. The laminates can be formed into any desired shape prior to removal of solvent and conversion to the second stage benzimidazoquinazoline polymer. Films of the polymers can be used as sheet insulation in electric motors and transformers, cables, capacitors, and the like. Varnishes can be prepared by dissolving the polymers, or the intermediate polyamides, in suitable solvents.

The following examples are intended to illustrate the present invention, but no limitations to the scope of the invention are implied. In the examples, all parts are by weight unless otherwise specified.

EXAMPLE 1

A solution of 1.04 parts of 2,2′-di-(o-aminophenyl)-5,5′-bibenzimidazole (M.P. 372°–373° C.; prepared by melt condensation of phenyl anthranilate with 3,3′,4,4′-tetraaminobiphenyl, or by reaction of benzidine with o-nitrobenzoyl chloride, nitration and reduction), 0.1 part of lithium chloride and 1 part of triethylamine in 15 parts of dimethylacetamide is cooled in an ice-water bath and a solution of 0.51 part of isophthaloyl chloride in 3 parts of dimethylacetamide is added at once under good magnetic stirring. The reaction is allowed to proceed at room temperature for 45 minutes. The polymer solution is poured into aqueous methanol and the precipitated polymer is filtered off, washed with water and methanol and dried in a vacuum oven for 2 hours at 60°–70° C. The inherent viscosity of the polymer is $<\eta>=0.27$ in a 0.5 percent dimethylacetamide solution at 25° C. The polymer shows the characteristic amide absorption in infrared spectroscopic analysis, and comprises the polyamidobenzimidazole first stage polymer. After heating at 300° to 350° C. for 2 hours under 0.5 mm. pressure, a polymer is obtained which shows no amide absorption in the infrared spectrum and which on thermogravimetric analysis loses 10 percent of its weight at 602° C. in air. The polymer has an inherent viscosity of 0.45 in concentrated sulfuric acid solution (0.5 percent, 25° C.). This polymer can be termed poly-biphenylbenzimidazoquinazoline.

A 15 percent solution of the polymer in N-methyl pyrrolidine was sprayed from a spray gun onto an untreated plywood panel. After the desired thickness (about 3 mils) of polymer coating had been reached, the panel was dried in air at 50° C. for one day and then at 75° C. under vacuum for 3 hours. This produced an attractive wood finish of the polybiphenylbenzimidazoquinazoline. The so-coated panel shows remarkable resistance to ignition by a free flame.

EXAMPLE 2

A solution of 4.32 parts of 2,2′-di-(d-aminophenyl)-5,5′-oxybibenzimidazole (M.P. 295°–297° C., prepared from p-oxydianiline by reaction with o-nitrobenzoyl chloride, followed by nitration, reduction and cyclization), 0.2 part of lithium chloride, 2 parts of triethylamine in 40 parts of dimethylacetamide is cooled to −10° C. and a solution of 2.03 parts of isophthaloyl chloride in 12 parts of dimethyl acetamide is added with rapid stirring. The viscous reaction mixture is allowed to warm up to room temperature and stirring is continued for 1 hour. The polymer solution is then poured into aqueous methanol and the precipitated polymer is washed with water and methanol and dried. The polymer exhibits an inherent viscosity of 0.37 in dimethylacetamide solution (0.5 percent, 25° C.). Heating at 350° C. for 2 hours under 0.5 mm. pressure converts the first stage polymer to the fully condensed polybenzimidazoquinazoline. The final polymer is soluble in formic acid and shows an inherent viscosity of 0.71 (1 percent, 25° C.).

A solution of the polyamide prepolymer in dimethylacetamide (20 percent solids) was coated on 25 gauge copper wire by means of coating dies, and the coated wire was passed vertically through an oven of 6 feet height. The oven temperature ranged from 100° C. at the bottom to 370° C. at the top, and the wire speed was 4 to 6 feet per minute. While passing through the oven, the polyamide benzimidazole was thermally converted to the polybenzimidazoquinazoline. A flexible coating was obtained, which resists common organic solvents (hexane, acetone, chloroform, xylene) and dilute acids. Tests carried out at elevated temperatures show that this insulation is excellent for use in Class H electrical equipment.

EXAMPLE 3

A solution of 4.325 parts of 2,2'-di(o-aminophenyl)-5,5'-oxy-bibenzimidazole in 30 parts of dimethyl acetamide is cooled externally by an ice-water bath and 1.83 parts of adipoyl chloride dissolved in 10 parts of dimethyl acetamide is added with stirring. After 1 hour the viscous solution is poured into dilute aqueous sodium bicarbonate, and the precipitated white polymer is filtered off, washed repeatedly with water and methanol and finally dried under vacuum at 50° C. The inherent viscosity of this polymer is $<\eta>=0.35$ in dimethyl acetamide solution (0.5 percent, 25° C.). By heating at 250° to 300° C. for 3 hours under 0.5 mm. Hg pressure, this polyamide first stage polymer is converted to the condensed polytetramethylene benzimidazoquinazoline structure. The final polymer is soluble in formic acid and N-methyl pyrrolidone and shows an inherent viscosity of $<\eta>=0.77$ (1 percent formic acid, 25° C.).

EXAMPLE 4

A mixture of 5.7 parts of N,N'-di-(o-carbophenoxyphenyl)-isophthalamide (M.P. 194°–195° C., prepared by reaction of phenyl anthranilate and isophthaloyl chloride) and 2.15 parts of 3,3',4,4'-tetraaminobiphenyl is placed into a 100 ml. flask which is repeatedly evacuated and refilled with nitrogen. While under a slow stream of nitrogen, the flask is immersed into a Wood's metal bath at about 200° C. The temperature is raised quickly to 220° C. to start the condensation reaction. The evolved phenol and water are allowed to condense in a receiving flask. The mixture is heated for 1 hour at 220°–225° C. and then the pressure is slightly reduced to facilitate phenol removal. Twenty minutes later the pressure is reduced to about 0.5 mm. of mercury while the temperature is raised from 225° C. to 260° C. within 30 minutes. Heating is continued for 1 hour at 260° C. and at 280° C. for 30 minutes more. The metal bath is removed and the system allowed to cool, while under vacuum. The crushed polymer shows an inherent viscosity $<\eta>=0.18$ from a 0.5 percent solution in dimethylacetamide at 25° C. Part of this material when reheated under vacuum at 300°–400° C. for 2½ hours gives a clear, spongy, slightly yellow material with $<\eta>=0.41$. The product is polybiphenylbenzimidazoquinazoline and is soluble in formic acid and N-methyl-pyrrolidone.

What is claimed is:

1. A substantially linear film and fiber forming polybenzimidazoquinazoline consisting essentially of the recurring unit

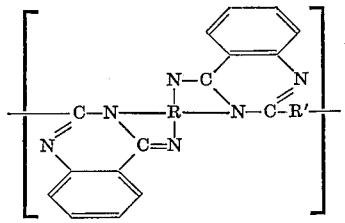

wherein R is a tetravalent radical of the group consisting of

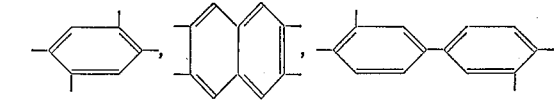

and

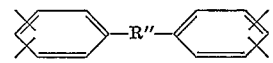

wherein R" is an alkylene chain having 1 to 3 carbon atoms, $$-O-, -S-, -CO-, -SO_2- \text{ or } -\underset{R'''}{\underset{|}{N}}-, R'''$$

being alkyl or aryl, the nitrogen atoms attached thereto being attached directly to separate carbon atoms in a ring of the R radical and each pair of nitrogen atoms attached thereto being attached to adjacent carbon atoms in a ring of the R radical; and R' is a divalent radical of the group consisting of alkylene radicals having 1 to 12 carbon atoms,

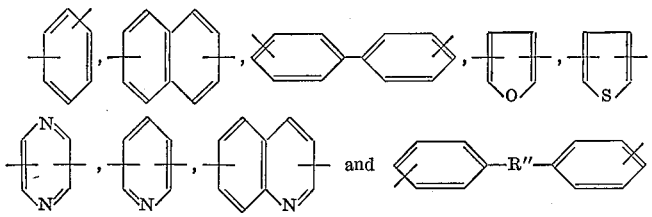

wherein R" is an alkylene chain having 1 to 3 carbon atoms, $$-O-, -S-, -CO-, -SO_2- \text{ or } -\underset{R'''}{\underset{|}{N}}-, R'''$$

being alkyl or aryl.

2. A film and fiber forming polyamidobenzimidazole polymer consisting essentially of the recurring unit

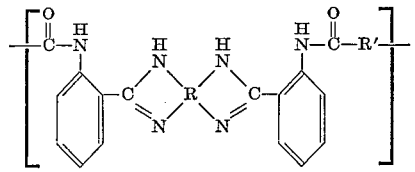

wherein R is a tetravalent radical of the group consisting of

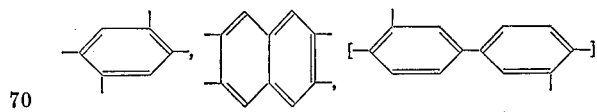

and

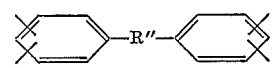

wherein R″ is an alkylene chain having 1 to 3 carbon atoms, $$-O-, \quad -S-, \quad -CO-, \quad -SO_2- \text{ or } -\underset{\underset{R'''}{|}}{N}-$$

R‴ being alkyl or aryl, the nitrogen atoms attached thereto being attached directly to separate carbon atoms in a ring of the R radical and each pair of nitrogen atoms being attached to adjacent carbon atoms in a ring of the R radical; and R′ is a divalent radical of the group consisting of alkylene radicals having 1 to 12 carbon atoms.

[structures: phenylene, naphthylene, biphenylene, furan]

[structures: thiophene, pyrazine, pyridine, quinoline]

and

[structure: phenyl–R″–phenyl]

wherein R″ is an alkylene chain having 1 to 3 carbon atoms, $$-O-, \quad -S-, \quad -CO-, \quad -SO_2- \text{ or } -\underset{\underset{R'''}{|}}{N}-$$

R‴ being alkyl or aryl.

3. A substantially linear polybenzimidazoquinazoline consisting essentially of the recurring unit

[structural formula of recurring unit]

wherein R is a radical [consisting essentially] of the group consisting of

[structures: phenylene, naphthylene, biphenylene]

and

[structure: phenyl–R–phenyl]

R″ in said radicals being an alkylene chain having 1–3 carbon atoms, $$-CO-, \quad -O-, \quad -S-, \quad -SO_2- \text{ or } -\underset{\underset{R'''}{|}}{N}-$$

wherein R‴ is alkyl or aryl.

4. A substantially linear film and fiber forming polyamidobenzimidazole consisting essentially of the recurring unit

[structural formula of recurring unit]

wherein R is a radical of the group consisting of

[structures: phenylene, naphthylene]

[−phenyl–phenyl−] and [phenyl–R″–phenyl]

the nitrogen atoms attached thereto being attached directly to separate carbon atoms in a ring of the R radical and each pair of nitrogen atoms attached thereto being attached to adjacent carbon atoms in a ring of the R radical; and R′ is a divalent radical of the group consisting of

[structures: phenylene, naphthylene]

[structure: biphenylene] and [phenyl–R″–phenyl]

R″ in said radicals being an alkylene chain having 1–3 carbon atoms $$-CO-, \quad -O-, \quad -S-, \quad -SO_2- \text{ or } -\underset{\underset{R'''}{|}}{N}-$$

wherein R‴ is alkyl or aryl.

5. A film and fiber forming polybenzimidazoquinazoline consisting essentially of the recurring unit:

[structural formula of recurring unit]

6. A film and fiber forming polybenzimidazoquinazoline consisting essentially of the recurring unit:

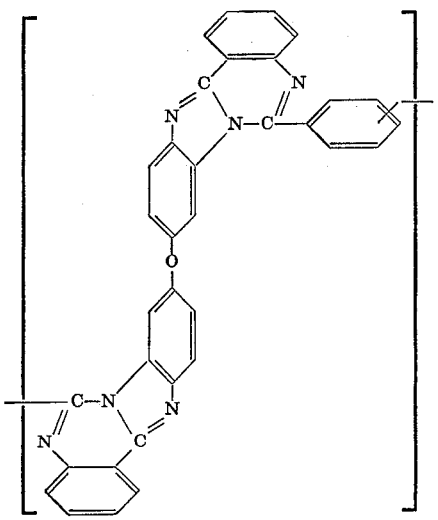

7. Polybenzimidazoquinazoline consisting essentially of the recurring unit:

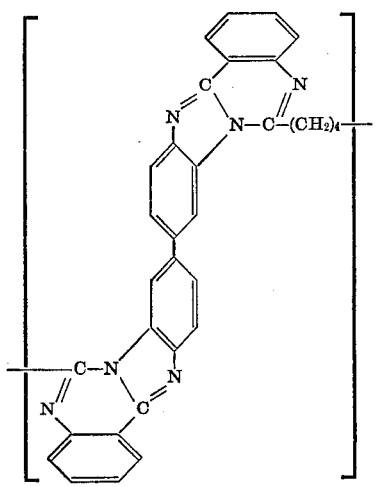

8. An electrically conductive wire coated with a substantially linear polybenzimidazoquinazoline consisting essentially of the recurring unit

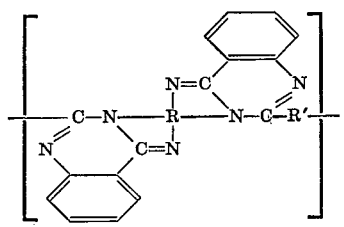

wherein R is a tetravalent radical of the group consisting of

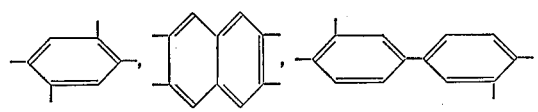

and

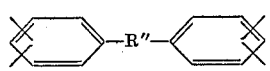

wherein R'' is an alkylene chain having 1 to 3 carbon atoms, $$-O-, -S-, -CO-, -SO_2- \text{ or } -\underset{R'''}{N}-$$

R''' being alkyl or aryl, the nitrogen atoms attached thereto being attached directly to separate carbon atoms in a ring of the R radical and each pair of nitrogen atoms attached thereto being attached to adjacent carbon atoms in a ring of the R radical; and R' is a divalent radical of the group consisting of alkylene radicals having 1 to 12 carbon atoms,

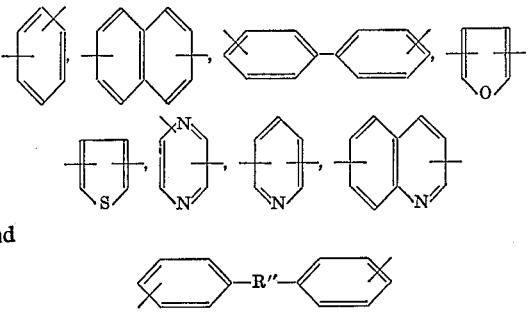

and

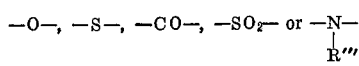

wherein R'' is an alkylene chain having 1 to 3 carbon atoms, $$-O-, -S-, -CO-, -SO_2- \text{ or } -\underset{R'''}{N}-$$

R''' being alkyl or aryl.

9. A non-metallic surface coated with a film of a substantially linear polybenzimidazoquinazoline consisting essentially of the recurring unit

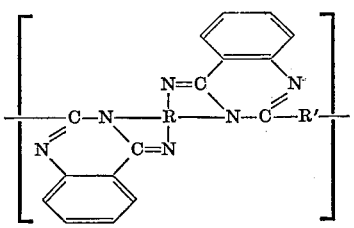

wherein R is a tetravalent radical of the group consisting of

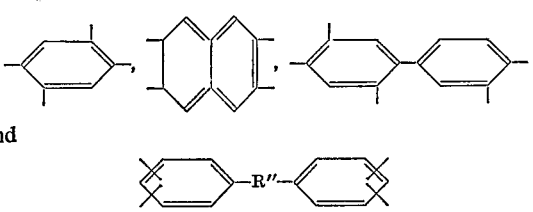

and

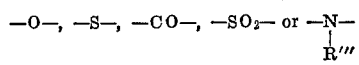

wherein R'' is an alkylene chain having 1 to 3 carbon atoms, $$-O-, -S-, -CO-, -SO_2- \text{ or } -\underset{R'''}{N}-$$

R''' being alkyl or aryl, the nitrogen atoms attached thereto being attached directly to separate carbon atoms in a ring of the R radical and each pair of nitrogen atoms attached thereto being attached to adjacent carbon atoms in a ring of the R radical; and R' is a divalent radical of the group consisting of alkylene radicals having 1 to 12 carbon atoms,

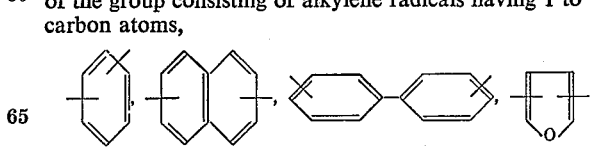

and

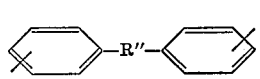

wherein R'' is an alkylene chain having 1 to 3 carbon atoms, $$-O-, -S-, -CO-, -SO_2- \text{ or } -\underset{R'''}{N}-$$

R''' being alkyl or aryl.

References Cited

UNITED STATES PATENTS 3,324,086   6/1967   Preston _____ 260—78

OTHER REFERENCES

Iwakura et al.: Polybenzimidazoles. III Polyamides Containing Benzimidazole Rings, Die Makromolekulare Chemie, Vol. 77, pp. 41–50, Aug. 17, 1964.

WILLIAM H. SHORT, Primary Examiner

L. L. LEE, Assistant Examiner

U.S. Cl. X.R.

117—161, 232; 161—197; 260—30.8, 32.4, 32.6, 65, 78, 78.4

UNITED STATES PATENT OFFICE
CERTIFICATE OF CORRECTION

Patent No. 3,503,929                      March 31, 1970

Basil L. Loudas

It is certified that error appears in the above identified patent and that said Letters Patent are hereby corrected as shown below:

Column 1, line 21, "stgae" should read -- stage --. Column 2, line 48, "R'''" should read -- R'' --; line 50, after "and" insert -- R''' --. Column 3, line 16, "the", first occurrence, should read -- to --. Column 4, line 19, change the comma at the end of the line to a hyphen; line 20, "4,4-dicarboxylic" should read -- 4,4'-dicarboxylic --; line 40, "another" should read -- an ether --; line 57, "dine" should read -- dene --; line 62, "bibezimidazoles" should read -- bibenzimidazoles --; same column 4, equation at the bottom should appear as shown below:

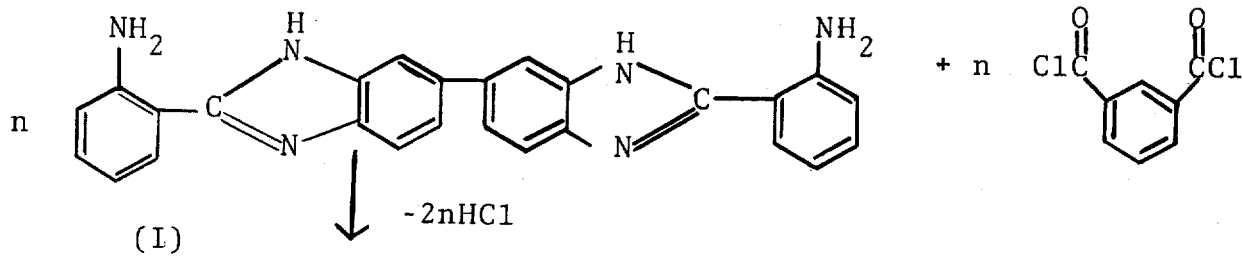

Column 10, line 22, "R'''" should be at beginning of line 26.
Column 10, line 48, "R'''" should be at beginning of line 51.
Column 10, line 68; Column 11, line 51 and Column 12, line 29, the brackets and all within the brackets should be deleted.
Column 12, lines 13 to 19, the formula should appear as shown below:

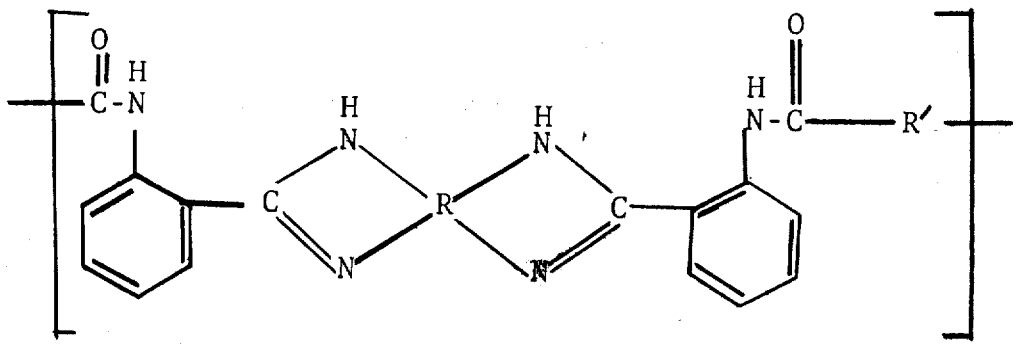

Signed and sealed this 1st day of September 1970.

(SEAL)
Attest:

EDWARD M. FLETCHER, JR.
Attesting Officer

WILLIAM E. SCHUYLER, JR.
Commissioner of Patents